United States Patent [19]

Pastor

[11] Patent Number: 5,170,044

[45] Date of Patent: Dec. 8, 1992

[54] ERROR TOLERANT 3X3 BIT-MAP CODING OF BINARY DATA AND METHOD OF DECODING

[75] Inventor: Jose Pastor, Stamford, Conn.

[73] Assignee: Pitney Bowes Inc., Stamford, Conn.

[21] Appl. No.: 610,907

[22] Filed: Nov. 9, 1990

[51] Int. Cl.⁵ .................... G06K 7/10; G06K 19/06
[52] U.S. Cl. ................... 235/454; 235/494; 371/6
[58] Field of Search ............. 235/437, 456, 494; 341/8, 9, 13, 94; 380/54; 371/2.1, 6

[56] References Cited

U.S. PATENT DOCUMENTS

| | | | |
|---|---|---|---|
| Re. 31,501 | 1/1984 | Lorenzo | 235/435 |
| 2,784,392 | 3/1957 | Chaimowicz | 340/174 |
| 3,106,706 | 10/1963 | Kolanowski et al. | 340/345 |
| 3,275,806 | 9/1966 | Quinn et al. | 235/61.12 |
| 3,453,419 | 7/1969 | Torrey | 235/61.11 |
| 3,529,133 | 9/1970 | Kent et al. | 235/61.11 |
| 3,544,771 | 12/1970 | O'Meara | 235/61.12 |
| 3,776,454 | 12/1973 | Jones . | |
| 3,869,600 | 3/1975 | Hochstadt | 235/61.12 R |
| 3,914,877 | 10/1975 | Hines | 380/54 |
| 4,263,504 | 4/1981 | Thomas | 235/487 |
| 4,286,146 | 7/1981 | Uno et al. | 235/456 |
| 4,590,366 | 5/1986 | Bothfjell | 235/494 |
| 4,637,051 | 1/1987 | Clark | 382/1 |
| 4,692,603 | 9/1987 | Brass et al. | 235/454 |
| 4,728,783 | 3/1988 | Brass et al. | 235/456 |
| 4,754,127 | 6/1988 | Brass et al. | 235/456 |
| 4,776,013 | 10/1988 | Kafri et al. | 380/54 |
| 4,782,221 | 11/1988 | Brass et al. | 235/494 |
| 4,786,792 | 11/1988 | Pierce et al. | 235/456 |
| 4,874,936 | 10/1989 | Chandler et al. | 235/494 |
| 4,896,029 | 1/1990 | Chandler et al. | 235/494 |
| 4,926,035 | 5/1990 | Fujisaki | 235/494 |
| 4,934,078 | 5/1990 | Saigt'Anselmo et al. | 235/495 |
| 4,939,354 | 7/1990 | Priddy et al. | 235/456 |

FOREIGN PATENT DOCUMENTS 63-19983 1/1988 Japan .

*Primary Examiner*—John W. Shepperd
*Attorney, Agent, or Firm*—Robert H. Whisker; Melvin J. Scolnick

[57] ABSTRACT

A method and apparatus for the representation of binary data. Each bit of binary data corresponds to one of two representations, where each representation is a 3×3 array of cells. In a first representation five cells of the array are asserted and four cells are not asserted, and the second representation is complementary to the first representation. In the first representation the asserted cells are the four corner cells and the central cell of the 3×3 array. These representations are preferred since they minimize the possibility of long runs of contiguous cells having the same value in an indicia representing a plurality of data bits; which is useful to synchronize scanning of the indicia. An error in the transcription of a data bit is detected by comparison of a nominal representation with the received 3×3 array in determining the number of cells which differ between the nominal and the received representations. If the number of cells which differ between the nominal and the received representations is less than five, the received 3×3 array is assumed to correspond to the selected nominal representation, otherwise the received array is assumed to correspond to the complementary representation. In one embodiment disclosed, binary data is represented by printing indicia composed of pluralities of such 3×3 arrays. In another embodiment disclosed the printed binary data comprises encrypted information printed on an envelope to verify proper payment of postage for that mail piece.

6 Claims, 4 Drawing Sheets

ERROR TOLERANT 3X3 BIT-MAP CODING OF BINARY DATA AND METHOD OF DECODING

BACKGROUND OF THE INVENTION

This invention relates to representations of binary data and the recognition of such representations after their transmission over a noisy channel: that is, where the possibility that errors will be introduced into the data exists. (As used from time to time herein, the term "nominal representation" shall mean an ideal or assumed representation and the term "actual representation" shall mean the representation as received after transmission.) Particularly, it relates to the transmission of binary data in the form of a binary array, and still more particularly to binary arrays of pixels which are incorporated in a postal indicia printed by a postage meter.

The terms Electronic Postage Meter and Metering System, as used herein, also refer to other similar systems, such as parcel registers and tax stamp meters that dispense and account for value, and generally to systems for applying indicia to items to verify payment, or other status for that item.

U.S. Pat. No. 4,949,381; to: Jose Pastor; issued: Aug. 14, 1990, which is hereby incorporated by reference, discloses a method and apparatus for applying a postal indicia, which indicia represents an encrypted message and has the form of an array of pixels (i.e., picture elements), which array is preferably a binary array where the pixel values are either one or zero, and the array corresponds to binary data. In U.S. Pat. No. 4,949,381, the binary data represented by the array comprises encrypted postal information which, when decrypted by a carrier such as the United States Postal Service verifies payment of the appropriate postage. It is also taught in the above mentioned patent that the accuracy of transmission of the pixel array may be increased by a four-fold reflection of the array to introduce a four-fold redundancy for the detection of transmission errors.

While the method in apparatus described in U.S. Pat. No. 4,949,381 is believed to be adequate for its intended purpose it is also believed that further improvements in the capability for error detection and correction in an actual representation of a binary array of pixels would be highly beneficial. Accordingly, it is an object of the subject invention to provide an improved apparatus and method for the representation of binary data, and for the detection and correction of errors in actual representations of such binary data.

More particularly, it is an object of the subject invention to provide such method and apparatus which are suitable for use with binary data represented as an array of pixels.

While the description of preferred embodiments set forth below will be given primarily in terms of binary data which is represented as an array of pixels, those skilled in the art will recognize that when the array of pixels is scanned it is transformed into a time sequence of signals. Thus, it will be apparent that the error detection and correction methods of the subject invention may be readily be applied to properly formatted electronic, optical, etc., signals, which are transmitted without reduction to tangible form, as by printing of an indicia. Particularly, references to "center", "corner" and "edge" cells also may be taken as applying to signals comprising time sequences which correspond to scanning an array of pixels.

BRIEF SUMMARY OF THE INVENTION

The above objects are achieved and the disadvantages of the prior art are overcome in accordance with one aspect of the subject invention by means of a method for representing binary data by the steps of, first providing first and second representations, each comprising three by three arrays of cells, the first representation having the center and four corner cells asserted and the four edge cells not asserted, and the second representation being the complement of the first representation. That is, the inverse representation where the corner and center cells are not asserted and the edge cells are asserted. Bits having a first value are then represented by the first representation, and bits having a second value are represented by the second representation.

In accordance with another aspect of the subject invention, a method and apparatus are provided for recognizing binary data where each bit of data has a nominal representation as described above. An actual representation of a bit is received and the differences between the actual representation and (for example) the nominal first representation are determined, cell by cell. The corresponding bit is assigned (i.e., determined to have) a value of one, if and only if the number of differences is less than five; and otherwise is assigned a value of zero.

In accordance with another aspect of the subject invention the binary data is represented as an indicia comprising a binary array of pixels; each bit of data corresponding to an element of the array, and each element consisting of a three by three array of pixels. Each pixel of an element is asserted or not asserted in accordance with the value of the corresponding data bit and the above described representations.

In accordance with still another aspect of the subject invention the indicia forms part of a postal indicia such as is applied by a postage meter.

Many logically identical methods for representing and determining the value of binary data will be immediately apparent to those skilled in the art. For example, since the first and second representations are complimentary determining the differences between an actual representation and a nominal first representation immediately gives the number of differences between the actual representation and a nominal second representation, as simply nine minus the first number of differences. Also, the assignment of the value one to the first representation and zero to the second representation is completely arbitrary, as is the choice of asserted and not asserted states for the cells. Hereinafter, asserted pixels sometimes will be referred to as "black" and not asserted pixels sometimes will be referred to as "white".

Those skilled in the art will recognize that a particular advantage of the subject invention is that recognition of errors is computationally simple, while other error correction techniques, such as BCH and Hamming codes, can require the solution of large systems of simultaneous non-linear equations.

Other objects and advantages of the subject invention will be apparent to those skilled in the art from consideration the detailed description set forth below and from the attached drawings.

DETAILED DESCRIPTION OF PREFERRED EMBODIMENTS OF THE SUBJECT INVENTION

Figure 1:
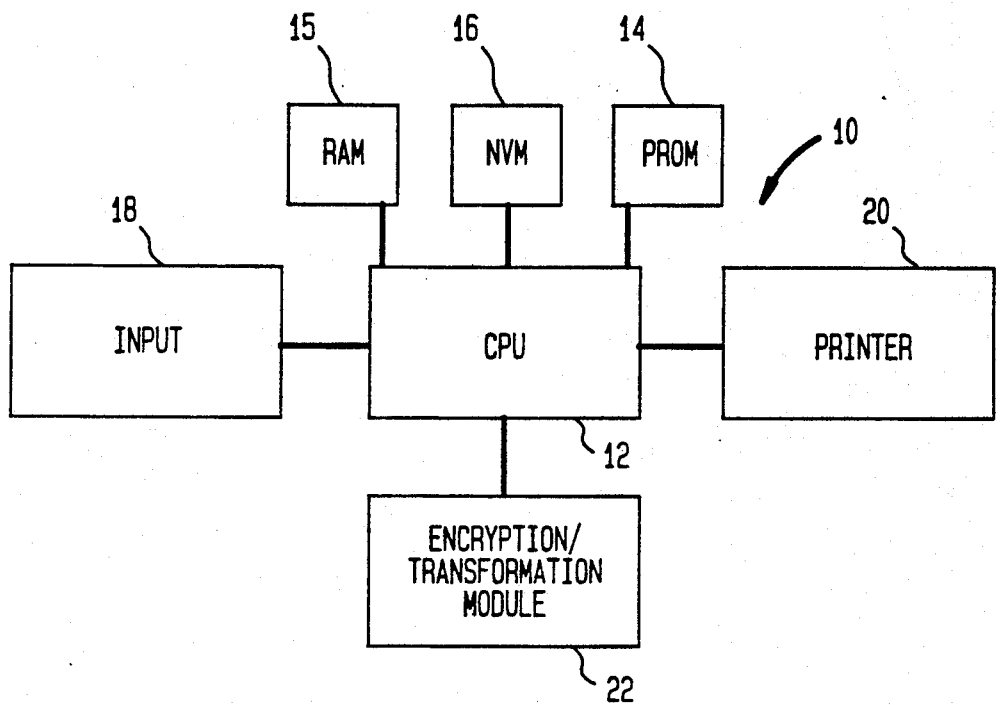
FIG. 1 shows a system for printing an indicia in accordance with the subject invention.

FIG. 1 shows a postage metering system 10, which may be used in accordance with the subject invention to frank mail pieces by printing on the mail pieces indicia which include encrypted binary data. System 10 includes CPU, or microprocessor, 12, which operates under the control of a program residing in PROM 14 and controls the basic meter functions, performs calculations based on any input data, and controls the flow of data into the various memories. Typically, a random access memory (RAM) 15 is connected to CPU 12 for the storage of real time information and for real time accounting of critical information including the updating of ascending and descending meter registers, which record the postage value expended and the value available, respectively. The register values are then stored in more pertinent form in non-volatile memory 16 either when power is interrupted, or on a real time basis, as is well known in the art.

The system operates in accordance with data (e.g. the postage value to be metered) supplied from an input, such as keyboard 18, or from another remote communication device. Such operation of postage meters is well known and is described for example in U.S. Pat. No. 4,301,507; to: Sodderberg.

Metering system 10 differs from conventional postage meters, which use letter press printing, in that CPU 12 is coupled to conventional, non-secure printer 20. Printer 20 receives print signals from CPU 12 for printing of postal information on an envelope, label or the like. Printer 20 may be a conventional dot-matrix pin printer, or any one of a number of like devices, such as ink jet printers, thermal printers, or LED printers suitable for receiving electronic signals and applying corresponding pixels to an item. Security against production of counterfeit indicia is not found in making the printer physically secure, but is provided by the form of the indicia (i.e., encryption).

As also seen in FIG. 1, CPU 12 is coupled to an encryption module 22. Module 22 operates on data to generate an encrypted message containing postal information relating to the mail piece, such as the amount of postage. One suitable encryption technique is described in U.S. Pat. No. 4,853,961; issued: Aug. 1, 1989; to: Pastore.

Figure 2:
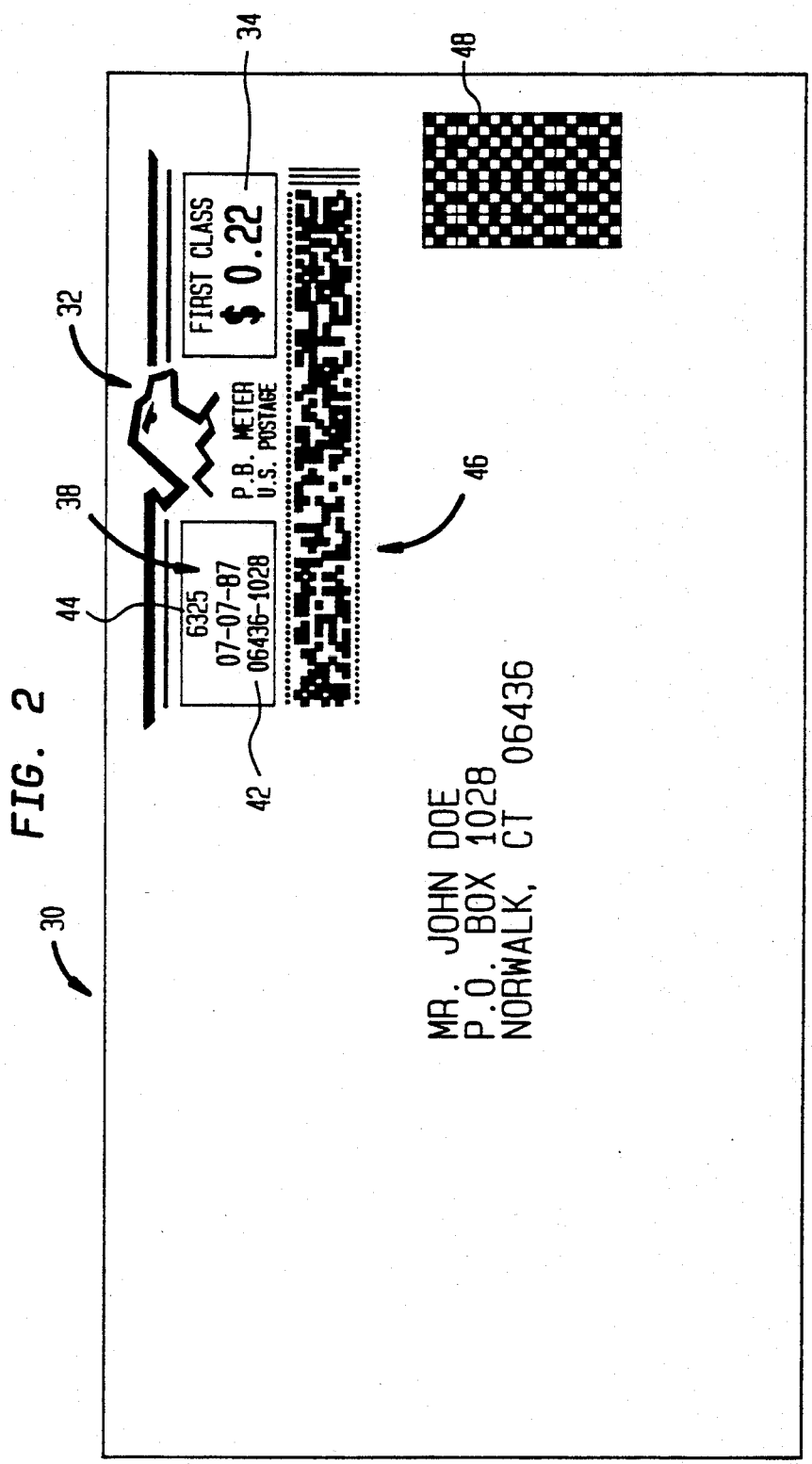
FIG. 2 shows a postal indicia comprising a binary array of pixels.

FIG. 2 shows an item to be mailed 30 (i.e., an envelope) marked with an indicia 32. Indicia 32 includes the following plain text information relating to the item: a postage amount 34, a date 38 on which the item was metered, an ID number 42 for meter 10, a second ID number 44 for the postal station to which the item is to be delivered in accordance with USPS regulations for metered mail. Indicia 32 also includes a binary array 46 comprising a mapping of encrypted data corresponding to at least a portion of the plain text information, together with additional information, in a known manner. Further description of the use of encrypted information, represented as a bit map (i.e., as an array of binary pixels) is not believed necessary to an understanding of the subject invention. Indicia 32 also includes a second binary array, or indicia, 48. Indicia 48 serves a dual purpose; first it identifies item 30 as a mail piece which is franked by an encrypted indicia (as opposed to ordinary meter indicia, stamps, etc.), and also it identifies the provider of metering system 10. It is important to identify the provider of metering system 10 because it is necessary in various protocols for validating mail pieces as properly franked which incorporate encrypted indicia to identify the provider of the metering system to decrypt the indicia. An example of such a protocol is disclosed in commonly assigned U.S Pat. No. 4,853,961; to: Pastor; issued Aug. 1, 1989.

While a further description of such protocols is not believed necessary to an understanding of the subject invention the importance of accurate identification of the provider is clear. Accordingly, the subject invention provides a robust method for representing information such as the provider identification in indicia 48, as is described further below.

Figure 3:
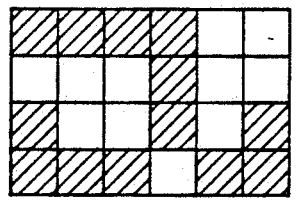
FIG. 3 shows an array of binary data corresponding to a portion of the array of FIG. 2.
Figure 4:
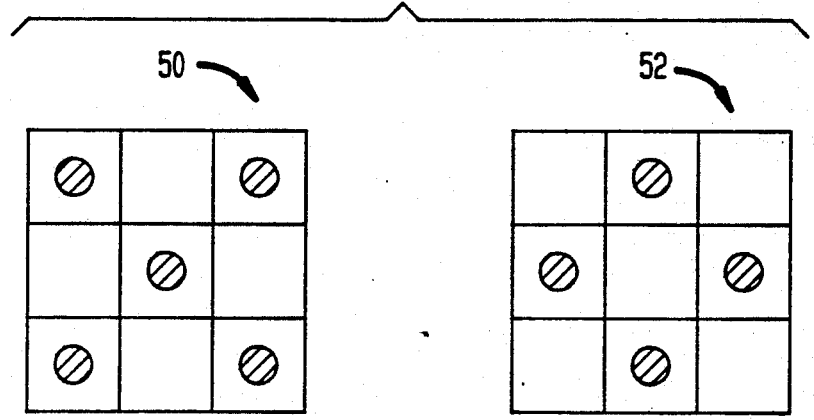
FIG. 4 shows nominal elements for representing binary data in accordance with the subject invention.

(As used herein "provider" means an organization which distributes metering systems, or which is responsible for the security of such systems. Also, as used herein from time to time the term "indicia" may refer to an indicia as a whole or to elements of such indicia when considered separately, as will be apparent from the context.) FIG. 3 shows a 6×4 array of pixels representative of a portion of indicia 48 where each of the 24 pixels represents one bit of the encrypted data incorporated in indicia 30. Black pixels are assumed to represent bits having a value one and white pixels represent bits having a value zero. In accordance with the subject invention each bit of encrypted data is represented by an element consisting of a 3×3 array of pixels, as shown in FIG. 4. In element 50 the corner and center pixels are asserted (e.g., printed as black) and the edge pixels are not asserted (e.g., not printed) and array 50 nominally corresponds to a bit having a one value. Element 52 is the complement of element 50 where the corner and center pixels are not asserted and the edge pixels are asserted and nominally corresponds to a bit having a zero value.

Those skilled in art will recognize that the nominal correspondence between elements 50 and 52 and bits having a one or zero value is arbitrary and that pixels may be considered asserted or not asserted by being produced in either of any two recognizably distinct states.

Figure 5:
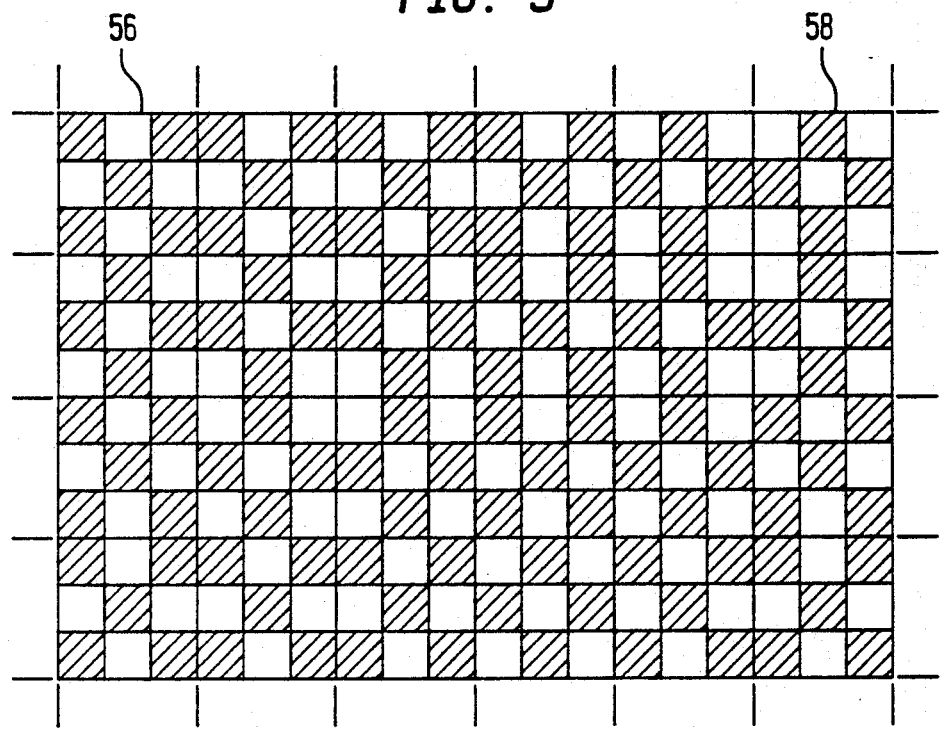
FIG. 5 shows an array of pixels corresponding to the binary data of FIG. 3, the pixels comprising three by three arrays forming elements of the indicia corresponding to bits of the data.

FIG. 5 represents a 18×12 array of pixels corresponding to the 6×4 array of FIG. 3, wherein each bit of data is represented by a 3×3 element of pixels as shown in FIG. 4, with the arrangement of the elements in FIG. 5 corresponding to the arrangement of pixels in FIG. 3. Upper left hand corner element 56 and upper right hand corner element 58 are representative, and correspond to bits having a one and having a zero value respectively.

Figure 6:
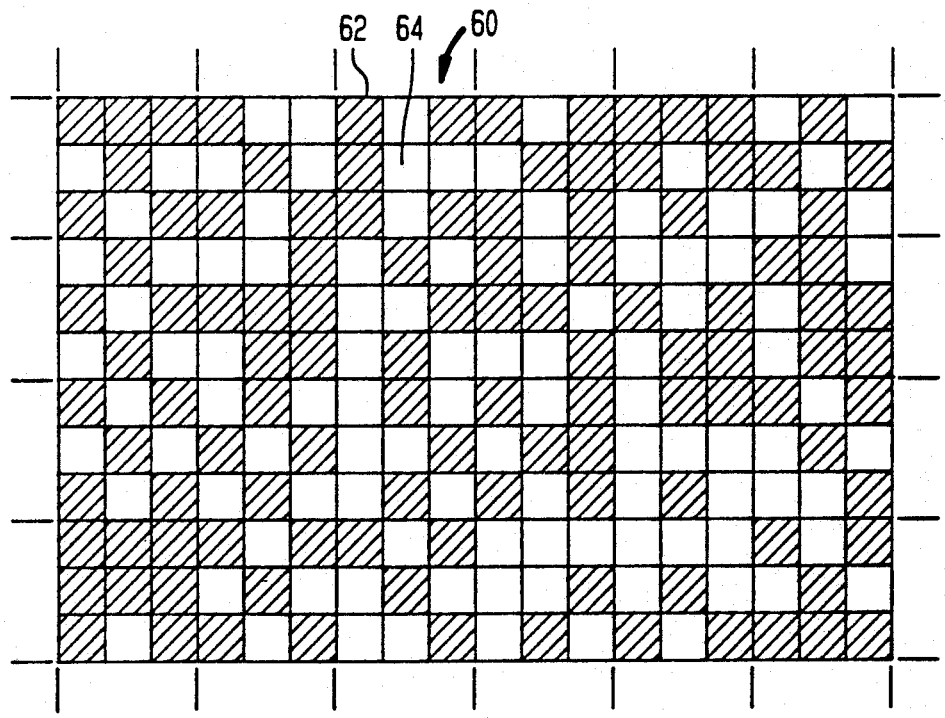
FIG. 6 shows a simulated) actual representation of the array of FIG. 4 where errors have been introduced by transmission.

FIG. 6 shows an actual representation of the array of FIG. 5, wherein the representations of 37 pixels are in error. Thus, in element 60 pixel 62, which is nominally white is actually represented as black, while pixel 64, which is nominally black is actually represented as white.

Figure 7:
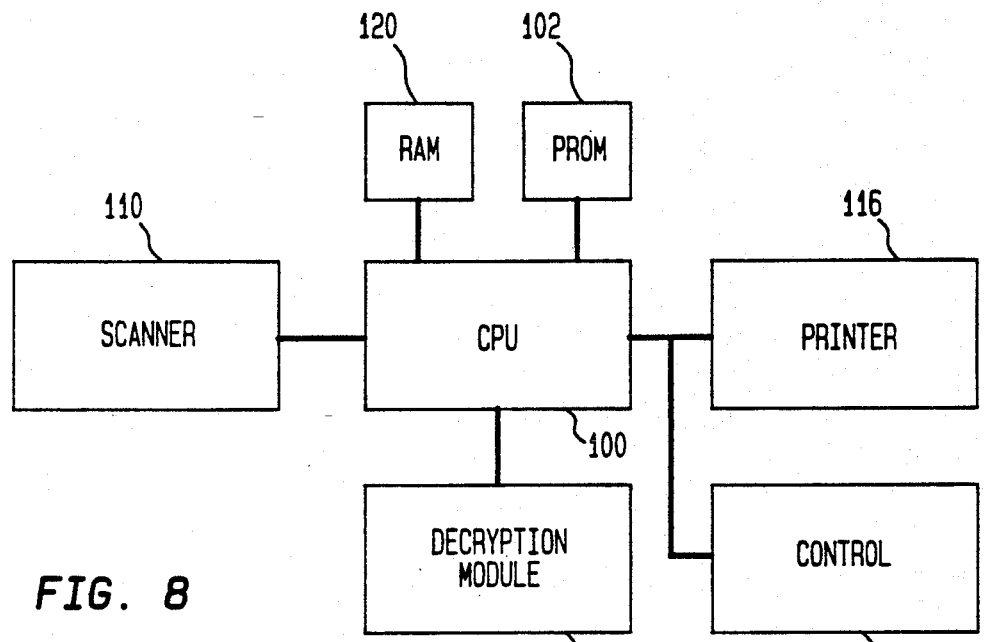
FIG. 7 shows a system for scanning indicia in accordance with the subject invention and determining the binary data represented.

FIG. 7 shows a system for validating postal indicia wherein actual arrays of pixels are scanned and the binary data represented by such arrays is recognized in accordance with the subject invention. CPU 100 operates under control of a program stored in PROM 102 to control conventional scanner 110. Mail pieces are transported to scanner 110 by a conventional transport system (not shown), which forms no part of the subject invention, and CPU 100 controls scanner 110 to scan the array of pixels comprised in the postal indicia on the mail piece. Such scanners are known and a substantially suitable scanner is substantially described in U.S. Pat. No. 4,692,603; to: Brass et al.; issued: Sep. 8, 1987; which is hereby incorporated by reference Scanner 110 responds to the array of binary pixels to produce a time sequence of binary signals corresponding to an actual representation of the binary data. CPU 100 then processes the actual representation of each element to determine if that element corresponds to a bit having a one value or a bit having a zero value so as to recover the binary data (representing the identity of the provider) even in the presence of errors introduced during transmissions. The provider identification is then transmitted to decryption module 112 where it is used to recover a decryption key for decrypting data scanned from indicia 46, and for then comparing the recovered data to the plain text data, which has also been recovered from the indicia in a conventional manner. CPU 100 responds to the detection of an invalid indicia by printing an appropriate record on printer 116 and controlling the transport to divert the mail piece for appropriate processing through controller 118. RAM memory 120 is preferably provided for temporary and working storage for CPU 100. In general numerous such techniques for validating encrypted postal indicia, such as that taught in the above mentioned U.S. Pat. No. 4,853,961, are known and a further descriptions of such techniques is not believed necessary to an understanding of the subject invention.

Figure 8:
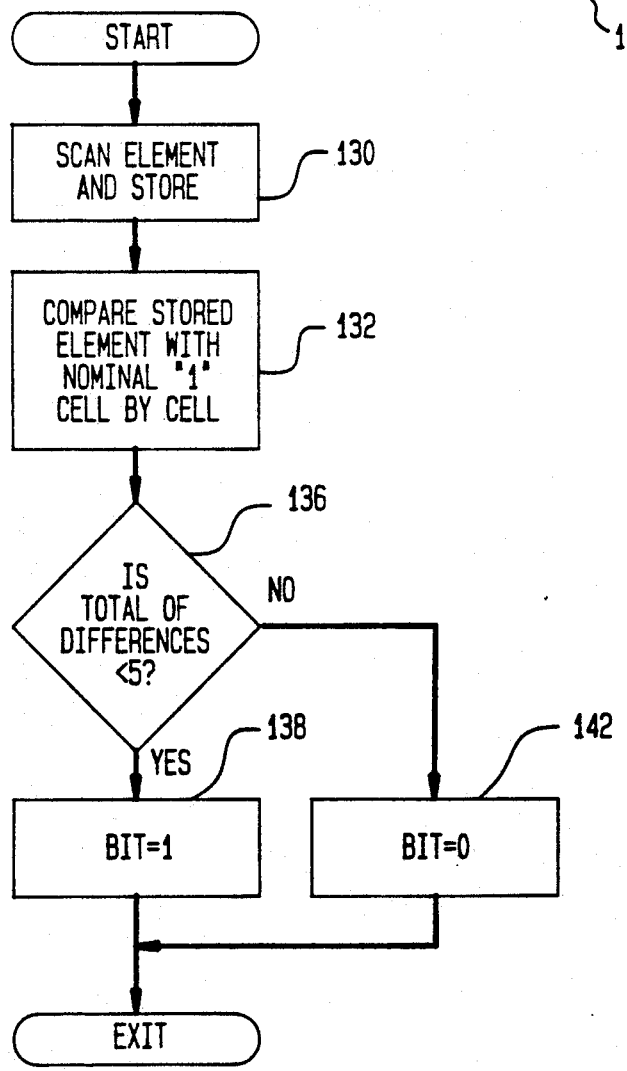
FIG. 8 is a flow chart of the operation of the system of FIG. 7.

FIG. 8 shows a flow chart of the operation of CPU 100 in determining whether a particular element corresponds to a bit having a one value or having a zero value. At 130 CPU 100 controls scanner 140 to scan an element of the array and stores the actual representation. At 132 CPU 100 compares the stored element with a nominal "one" element (i.e., nominal element 50) on a cell by cell basis. Then at 136 CPU 100 determines if the total number of differences between cells up of the actual representation and corresponding cells of the nominal "one" element is less than five. If so at 138 the corresponding bit is assigned a value of 1; otherwise, at 142, the corresponding bit is assigned a value of zero. The system then exits the error detection routine.

(FIG. 8, shows scanning of a single element only for ease of description. It will be readily apparent, and generally preferable, that an entire row of pixels in a binary array will be scanned at one time, and a row of elements determined substantially simultaneously. Necessary changes to the scanner to achieve this are easily within the skill of the art.)

Table 1, set forth below, shows the number of differences between each element of FIG. 6 and nominal representation 50, with values less than five underlined. The correspondence between the data of FIG. 3 and the lined and underlined values is immediately apparent.

TABLE 1

| | | | | | |
|---|---|---|---|---|---|
| <u>1</u> | <u>1</u> | <u>2</u> | <u>1</u> | 7 | 9 |
| 9 | 5 | 6 | <u>2</u> | 7 | 5 |
| <u>0</u> | 9 | 8 | <u>1</u> | 6 | <u>1</u> |
| <u>3</u> | <u>0</u> | <u>1</u> | 7 | <u>2</u> | <u>1</u> |

(Of course, if any cell in the above example had had five or more errors, that cell would have been misidentified.)

In a one embodiment of the subject invention the number of cells which differ from corresponding cells of the nominal representation may be easily determined by considering the columns and rows of an element to be numbered zero through two, from top to bottom and from left to right, respectively. Then, if $p_{ij}$ represents the pixel in the ith row and jth column, then $p_{ij}$ represents a difference if and only if $i+j$ is even and $p_{ij}$ is white; or $i+j$ is odd and $p_{ij}$ is black.

In another embodiment the number of differences may be determined by cross-correlation with a selected nominal representation.

In another embodiment each white cell may be assigned a value of zero and each black cell one of three values depending upon if the cell is a corner, edge or center cell; for example 10, 4 and 1 for corner, edge and center cells respectively. The resulting sums over each element may then be partitioned into two groups; one corresponding to nominal "one" elements, the other to nominal "zero" elements.

Other patterns of cells may also be chosen as nominal representations, and it is within the contemplation of the subject invention that any complementary pair of elements, one element having five black and four white cells, may be used as nominal representations. The nominal elements shown in FIG. 4 are preferred, however, since simple algorithms, as described above may be used to assign values to actual representations. Further, these representations minimize the possibility of long rows of contiguous cells in an indicia, having the same value, which is useful to synchronize scanning of the indicia.

The embodiments described above and illustrated in the attached drawings have been given by way of illustration only and those skilled in the art will recognize numerous other embodiments. Particularly, while the description of the determination of the bit value to be associated with an actual representation of an element is described with respect to a single element, for reasons of clarity, it is expected that it will prove preferable to scan and recognize a number of elements substantially simultaneously, which would easily be within the skill of those of ordinary skill in the art. Also, numerous other algorithms for recognition of elements which are logically identical to that described above will be readily apparent to those skilled in the art. Accordingly, limitations on the subject invention are to the found only in the claims set forth below.

What is claimed is:

1. Apparatus for producing an indicia, said indicia including a representation of data, comprising:

a) a printer;
b) programmable means for:
 b1) receiving said data;
 b2) forming said data into an array of equivalent binary data);
 b3) providing first and second nominal representations comprising three by three arrays of cells, said first nominal representation having five cells asserted and four cells not asserted, and said second nominal representation having five cells not asserted and four cells asserted, said first nominal representation corresponding to bits of binary data having a first value and said second nominal representation having correspondence to bits of binary data having a second value;
 b4) mapping said array of binary data into an array of said representations in accordance with said correspondences; and,
 b5) controlling said printer to print a binary array of pixels as part of said indicia, said pixels being in one to one correspondence with the cells of said array of representations.

2. A method as described in claim 1 wherein said drive asserted cells of said first nominal representation are the center and four corner cells of said first nominal representation.

3. Apparatus for recognizing binary data which is represented as an array of pixels, comprising:
a) a scanner
b) programmable means for:
 b1) controlling said scanner to scan a three by three element of said array corresponding to a bit of said data, and generate a time sequence of digital signals as an actual representation of said element;
 b2) comparing said actual representation with a nominal first representation, said nominal first representation having five cells asserted and four cells not asserted, to determine the total number of differences, cell by cell; and,
 b3) if said total number of differences is less than 5 assigning said corresponding bit a first binary value, and otherwise assigning said corresponding bit a second binary value.

4. Apparatus as described in claim 3 wherein said five asserted cells of said first nominal representation are the center and four corner cells of said first nominal representation.

5. A method of recognizing binary data which has been transmitted over a noisy channel, bits of said data having a first value having a first nominal representation comprising a three by three array of cells, five cells of said first nominal representation being asserted and four cells of said first nominal representation being not asserted, and bits of said data having a second value having a second nominal representation comprising a complementary three by three array of cells, said method comprising the steps of:
a) receiving an actual representation of a bit of said data;
b) determining the number of differences between said actual representation and a selected one of said nominal representation
c) assigning said selected bit the value associated with said selected nominal representation if and only if said number of differences is less than five, and otherwise assigning said bit the remaining value; wherein,
d) said five asserted cells of said first nominal representation are the center and four corner cells of said first nominal representation; and wherein,
e) transmission of said binary data comprises the steps of printing said indicia on a mail piece, transporting said mail piece, and scanning said array of pixels to produce a signal which is an actual representation of said binary data.

6. A method as described in claim 5 wherein said data comprises information identifying the provider of a mailing system for printing said indicia.

* * * * *